July 29, 1941.    L. E. BETZELBERGER    2,250,902
HAY RAKING LOADER
Filed Jan. 9, 1940    3 Sheets-Sheet 2
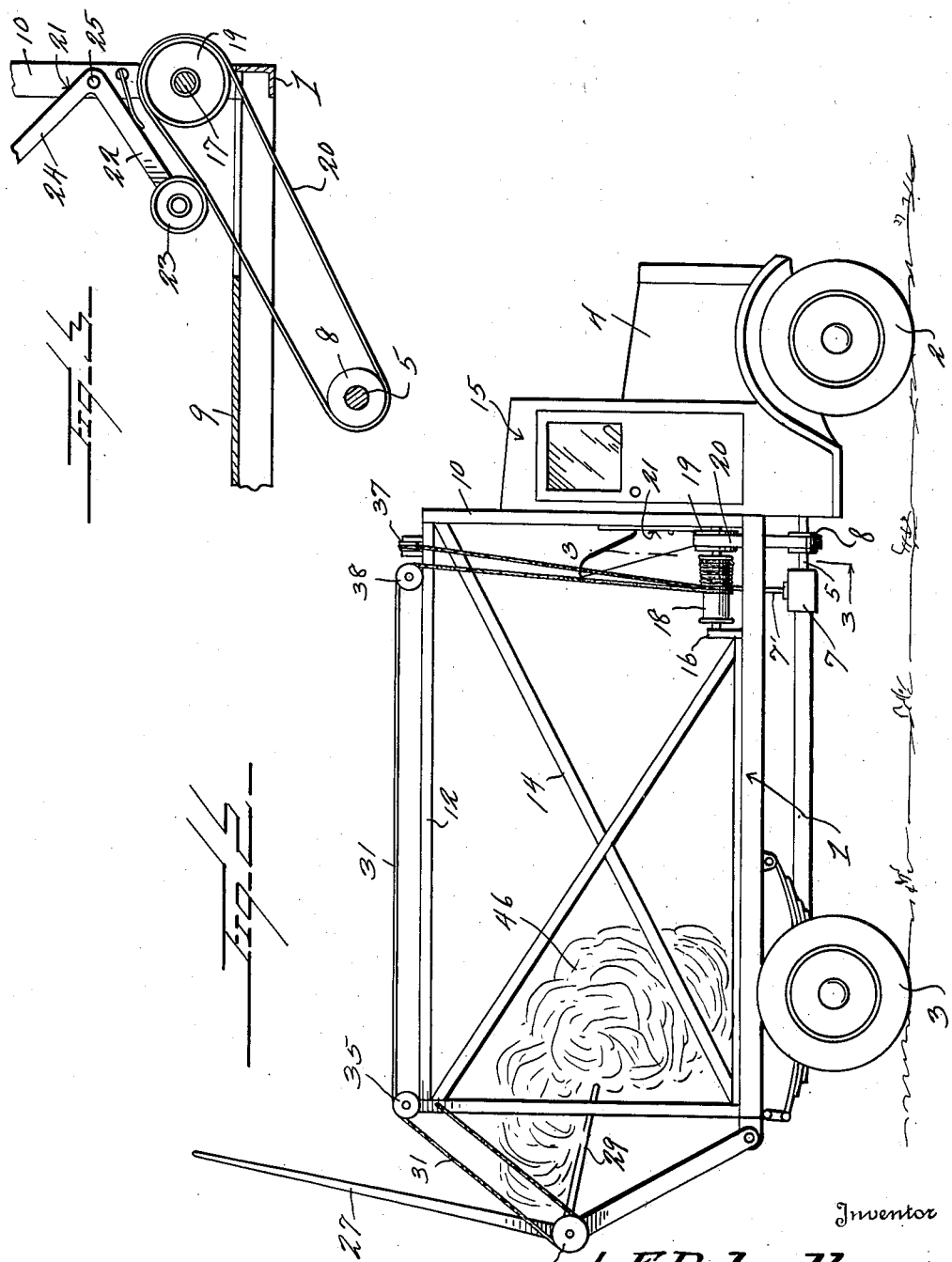
Inventor
L. E. Betzelberger
By Watson E. Coleman
Attorney

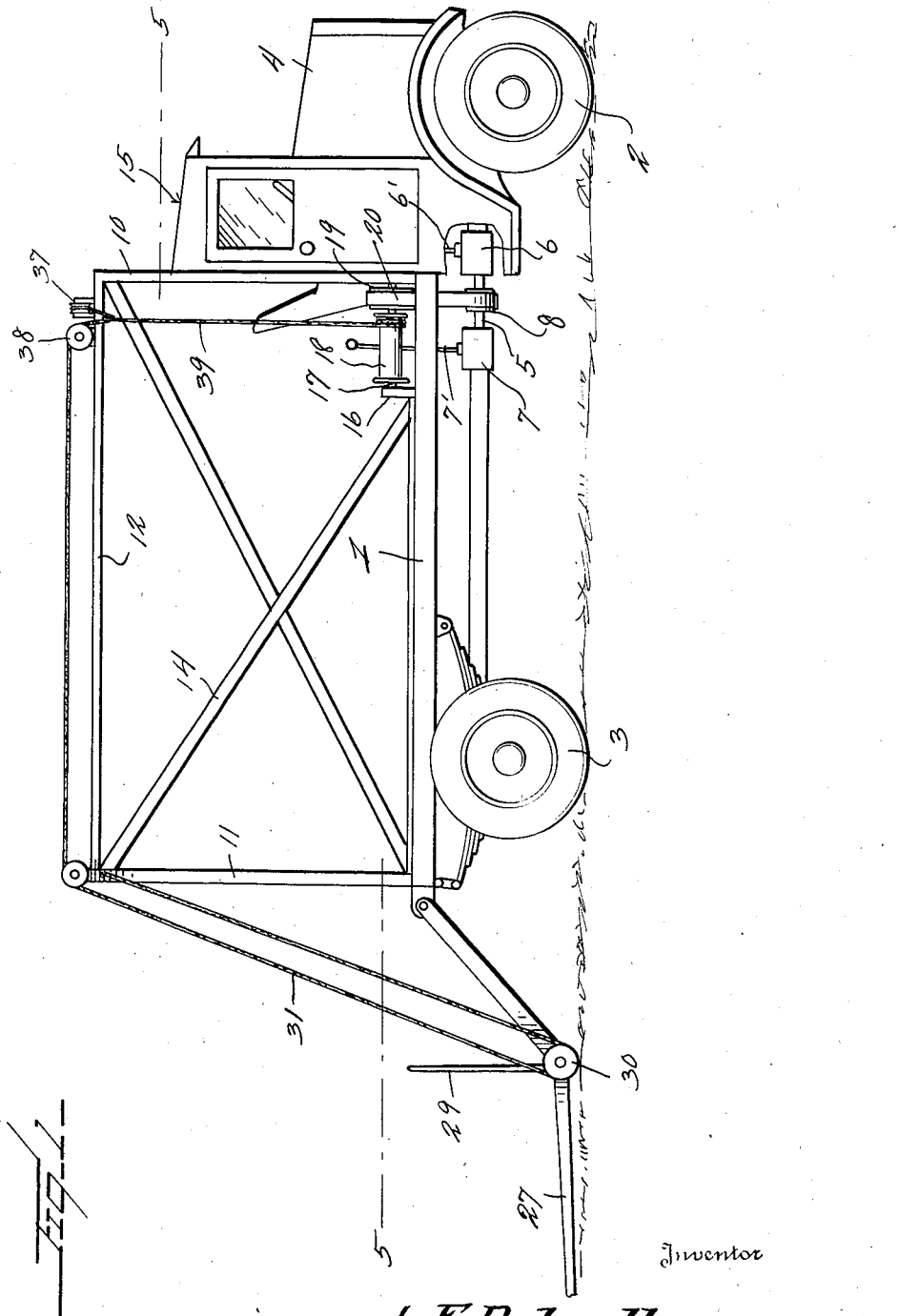

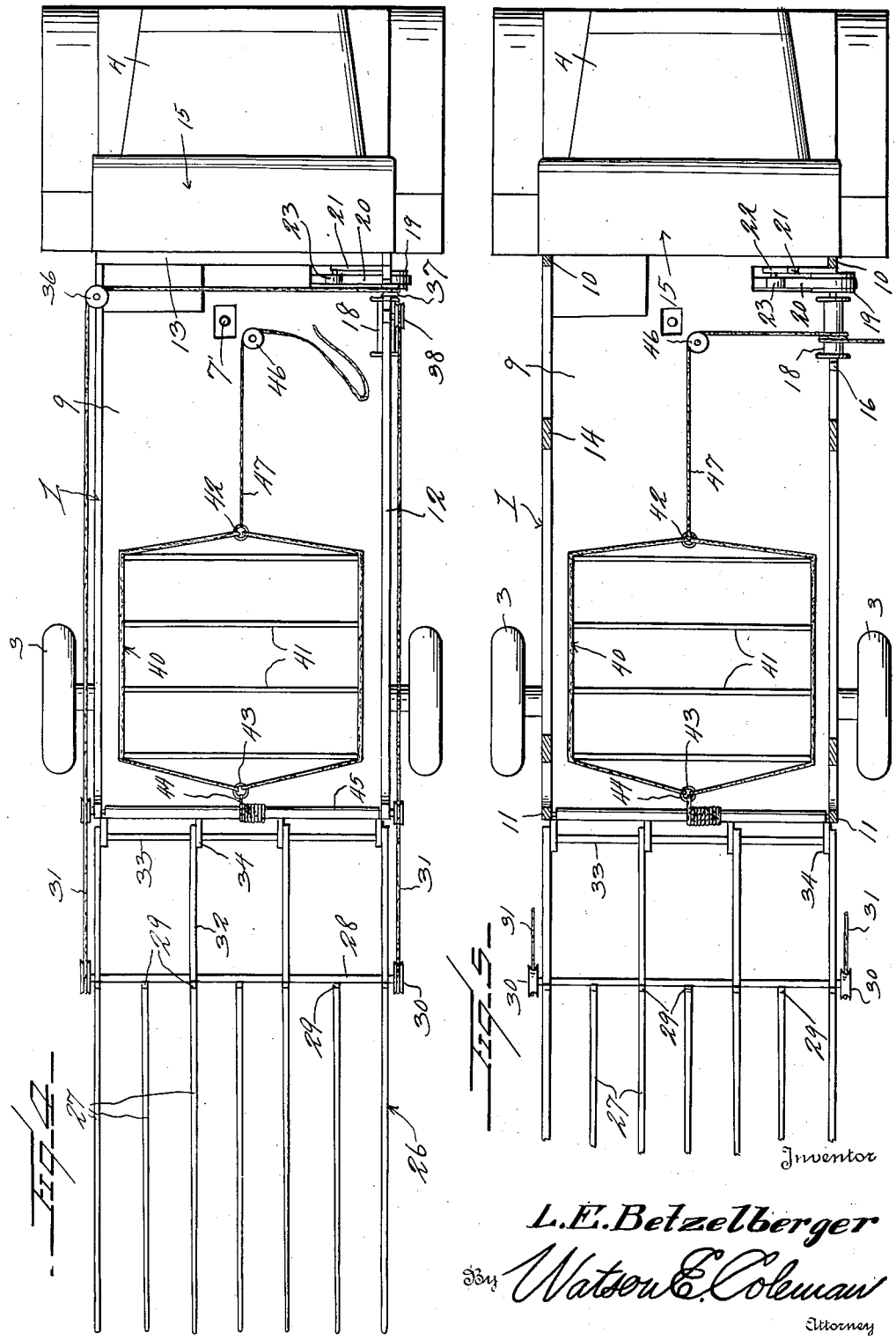

Patented July 29, 1941

2,250,902

UNITED STATES PATENT OFFICE 2,250,902

HAY RAKING LOADER

Logan E. Betzelberger, San Jose, Ill.

Application January 9, 1940, Serial No. 313,127

6 Claims. (Cl. 214—78)

This invention relates to improvements in hay rakes and loaders and pertains particularly to an improved self-loading structure.

The primary object of the present invention is to provide an improved hay loader consisting of a wheeled structure onto which hay is to be loaded in association with a rake pivotally supported to be raised to a position where gathered hay can be discharged onto the wheeled structure, means being provided whereby such rake may be easily swung upwardly to a discharging position where the supported hay will be discharged onto the body of the wheeled structure.

Another object of the invention is to provide a wheeled hay loader having a pivotally supported or attached rake with means for raising the rake to a discharging position with respect to the loader, wherein a novel means is provided for shifting the hay load from the end of the vehicle where it is dumped by the rake toward the opposite end thereof so that a full load of hay may be gathered and discharged onto the vehicle by the vertically oscillatable rake.

Still another object of the invention is to provide a wheeled hay loader or gatherer, wherein there is employed in association with a pivotally supported rake, a novel mechanism by which such rake may be raised to hay discharging position with respect to the body of the vehicle, by the operator of the vehicle without requiring the operator to move from a position which he occupies on the vehicle while running the same.

A still further object of the invention is to provide in a wheeled hay gatherer and loader, a novel power transmitting mechanism connected with the vehicle power unit by means of which a vertically swingable loading rake connected with the vehicle may be raised and lowered between its hay gathering position and its hay discharging position.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 is a view in side elevation of the hay gatherer and loader constructed in accordance with the present invention, showing the rake unit thereof in lowered position.

Fig. 2 is a view in side elevation of the structure, similar to Fig. 1, but showing the rake unit in raised position for discharge of hay into the vehicle.

Fig. 3 is a sectional view on the line 3—3 of Fig. 2.

Fig. 4 is a view in top plan of the structure embodying the present invention.

Fig. 5 is a view in horizontal section through the super-structure of the loader, taken substantially on the line 5—5 of Fig. 1.

Referring now more particularly to the drawings, the numeral 1 generally designates the chassis of a wheeled vehicle, the same being here illustrated as constituting that of a motor truck. It is to be understood, however, that the present invention may, if desired, be incorporated in a horse or animal-drawn wheeled structure as well as in connection with a motor driven structure, in which case suitable provision would be made for attaching the animals to the chassis so that the chassis might be drawn over the ground in the direction in which the rake points when it is in lowered working position. The present illustration and description have been confined, however, to a motor vehicle and as is shown, the chassis is supported in the usual manner by front wheels 2 and rear wheels 3, the engine (not shown) being enclosed under the hood 4 and transmitting power to the rear wheels 3 through the drive shaft 5 and the usual differential mechanism, not shown.

The numerals 6 and 7 designate transmission units connected in the drive shaft 5. These units have not been illustrated in detail as each constitutes a standard type of transmission such as is found in any motor driven vehicle and they are controlled by the usual levers 6' and 7'. Between these units the driving shaft supports a pulley wheel 8 for the purpose hereinafter stated.

The chassis 1 is provided with a floor structure 9 and supported by the chassis is a frame consisting of the front and rear upright posts 10 and 11, respectively, the longitudinal side beams 12, front beam 13 and side brace bars 14. This frame structure provides a means for maintaining hay in stacked position upon the chassis floor 9 as will be readily understood. At the forward part of the frame structure, a cab 15 is provided in which the steering mechanism is housed, the driver of the cab being seated in the rear part thereof in a convenient position to reach the transmission shift levers 6' and 7'. At one side of the chassis there is supported in a convenient manner as, for example, between an upright 10 and a bearing 16, a shaft 17 on which is mounted a drum 18 and a pulley wheel 19. The pulley wheel is connected by a belt 20 with the pulley 8 and this belt is slightly over-size so that it will normally remain idle even when the pulley 8 is being rotated. In other words, the belt is loose and, therefore, will slip on the pulley 8 until it is tightened in the manner about to be described.

In order that the belt 20 might be properly tightened to transmit rotary power from the pulley 8 to the pulley 19, there is provided a pivotally supported unit which, as shown in Fig. 3, is preferably in the form of a bell crank 21, one leg 22 being extended downwardly in substantially parallel relation with the upper run of the drive belt 20 and carrying an idler wheel or pulley 23 which rests upon the upper run of the belt. The other leg of the bell crank extends upwardly to form an operating or control lever 24 by means of which the idler 23 may be forced down against the belt. The crank is pivotally attached in the angle connecting the lever 24 and the arm 22, to the adjacent post 10, as indicated at 25.

At the rear end of the chassis there is disposed a hay rake which is indicated generally by the numeral 26 and which consists of a number of tines 27 joined at their rear ends to a cross bar 28 from which extends upwardly the series of arms 29. At each end of the bar 28 a relatively large sheave or pulley wheel 30 is rotatably supported to turn on an axis extending transversely of the rake. These pulleys serve a dual function in that they engage the ground and constitute a wheel support for the rear of the rake and they also have trained therearound the control or lifting ropes 31.

Extending rearwardly and upwardly from the bar 28 of the rake is a series of arms 32, each of which is pivotally attached to the rear end of the chassis by means of a supporting shaft 33 or in any other suitable manner, this shaft being here shown as being supported by rearwardly extending bearing units 34. By this means when the rake is pulled upwardly from the pulleys 30, it will rise to the position shown in Fig. 2, where the arms 29 will be disposed to extend inwardly and downwardly toward the floor of the chassis so that hay supported upon the rake will be piled in the vehicle.

The lifting of the rake is accomplished by the ropes 31. Each of these ropes has an end secured to the upper part of a rear upright 11 or to any other suitable part of the vehicle structure and they extend downwardly and under the pulleys 30, and then pass back upwardly and over the rear pulleys 35 which are supported upon the upper ends of the rear uprights 11. Upon one side of the vehicle the rope 31 passes to a front pulley 36 which is supported to turn on a vertical axis and which then passes transversely of the vehicle to a pulley 37 supported to turn on a horizontal longitudinally extending axis. Adjacent this latter pulley is a second front pulley which is indicated by the numeral 38 and which is supported to rotate on a horizontal axis extending tranversely of the vehicle and over this second pulley the other rope or cable 31 passes. The cables or ropes are joined adjacent the two pulleys 37 and 38 to form a single downwardly extending cable 39 which is wound on the drum 18.

Upon the floor 9 of the vehicle structure there is disposed a load shifter in the form of a frame 40 which may be formed of any suitable material such as rope or cable which is held in shape by cross slats 41 and at the forward end of this frame is a pull ring 42 while a similar ring 43 is connected with the frame at the rear. The rear ring 43 of the load shifting frame has a rope 44 connected therewith which is wound around a rotatable shaft 45 which extends transversely of the rear of the chassis. This rope 44 being wound around the shaft 45 provides means for restraining to some extent the forward shifting of the load shifter so that it will not tend to shift from its position as a result of vibration. At the forward part of the floor 9 of the vehicle, a pulley 46 is mounted for rotation on a vertical axis and around this pulley passes a rope 47 which is attached at one end to the front ring 42 of the load shifter while the other end is intended to be carried laterally from the pulley 46 and given one or two turns around the drum 18 when it is desired to employ the power transmitted to the drum for pulling the load shifter 40 forwardly over the floor of the vehicle.

In the operation of the vehicle herein described, it will, of course, be readily apparent that the vehicle will be run backwardly for scooping or picking up hay or other similar material, the rake being in the lowered position shown in Fig. 1 during this operation. Naturally the two transmission units will be set in the same position for transmitting the necessary power through the shaft 5 to the rear wheels. When a load of hay has been gathered on the rake tines, the vehicle is stopped and the rear transmission unit 7 put into neutral position. With the cable 39 wound or started on the drum 18, the operator of the machine then manipulates the belt tightener wheel 23 by pulling down upon the lever 24 so as to cause power to be transmitted from the shaft 5 to the shaft 17 on which the drum 18 is mounted. This winds up the rope or cable 39 and pulls the cables 31 so as to raise the rake to the position shown in Fig. 2, where the hay 46 will be dumped into the vehicle on the load shifter which is initially disposed at the rear of the vehicle floor. The rake may then be lowered and the operation repeated and when a sufficient quantity of hay has been dumped onto the shifter, this may be moved forwardly in the vehicle by giving the rope 47 one or two turns around the drum 18 and again tightening the belt 20 in the manner previously stated for the purpose of turning the drum and pulling the hay load forwardly. The movement of the load shifter may be effected in several steps or stages as the process of loading the vehicle proceeds until the vehicle is filled with all of the hay which it is possible to carry within the frame structure.

While no showing has been made, it will be readily apparent that the rake mechanism may be employed in association with a horse-drawn vehicle, mounted in the manner shown in Fig. 1 to the front of such vehicle. The same mechanism would also be made use of for raising and lowering the rake but the power means for operating the rope drum might be taken directly from the vehicle axle instead of having a power driven shaft as in the structure here disclosed. Such horse-drawn vehicle would, of course, have to be kept moving in order to operate the rake whereas in the present structure it will be readily seen that the rake may be raised and lowered by power furnished from the engine of the vehicle while the vehicle is standing.

From the foregoing, it will be readily apparent that there has here been described a relatively simple and easily operated hay rake and loader structure by means of which hay may be picked up and transferred to the vehicle in which it is to be transported from a field to a place of storage and the construction of the loader is such that it may be easily operated by one or two attendants.

What is claimed is:

1. A hay rake and loader, comprising a wheel supported vehicle including a floor structure and a framework supported thereon, said framework facilitating the stacking of hay on the floor, a prime mover forming a part of the vehicle structure, a cable drum supported upon the vehicle, means for establishing a driving connection between the drum and the prime mover, a hay rake, a plurality of arms pivotally connecting the rake with the vehicle and facilitating moving the rake from a raking position adjacent the ground to a raised position with respect to the vehicle floor whereby hay may be dumped onto the floor within said frame structure, a pair of lifting cables each secured at one end to a fixed part of the frame and extending across pulleys carried by the hay rake and the frame structure to said winding drum to have the other ends thereof wound up on the drum for the lifting of said rake to said raised position, a slatted frame disposed flat upon the vehicle floor for sliding movement thereon, and means for connecting the frame with said drum to facilitate moving the frame over the floor.

2. A hay rake and loader, comprising a wheel supported vehicle having a floor and a vertically disposed frame structure facilitating the stacking of hay on the floor, a power shaft, means for effecting the turning of said shaft, a drum supported on the vehicle, a pulley operatively coupled with the drum, a pulley coupled with said power shaft, a belt loosely coupling said pulleys, a rake unit pivotally attached to the vehicle to be shifted from a lowered position to a raised position, the rake when in said raised position being arranged to discharge hay onto said floor within the frame structure, pulleys carried by the rake and by the frame structure, ropes passing over said pulleys and operatively coupling the rake with said drum, means for effecting the tightening of said belt on said pulleys for establishing a driving connection between the power shaft and the drum, and a load shifting means upon said floor, comprising a horizontally disposed frame, the frame being of substantially the same width as the floor and of a length materially less than the length of the floor, and a pull rope attached to said last frame and adapted to be engaged with said drum to facilitate shifting the last frame longitudinally of the floor.

3. A hay loader of the character described, comprising a power driven wheeled vehicle having a driving coupling operatively connected between a power source and certain wheels of the vehicle, said vehicle having a floor, a pair of speed change transmission units connected in tandem in said driving coupling, a pulley carried by said coupling between the transmission units, a cable drum carried by the vehicle, an operative coupling between said pulley and said drum whereby rotary power may be transmitted to the drum from said coupling, a raking structure pivotally coupled with the vehicle for movement between a loading position adjacent the ground and an unloading position overlying the vehicle floor, a cable connected with said rake structure, pulleys carried by the vehicle over which said cable passes to said drum, and said cable being adapted to be wound up on the drum for the raising and lowering of the rake structure.

4. In a hay loader of the character stated, comprising a carrier body having a floor and means for raising and depositing hay onto the floor, a load shifter comprising a flat frame disposed upon said floor, a rotatable shaft supported at one end of the floor and transversely thereof, a restraining rope connected with said frame and wrapped around said shaft, the frame being normally disposed at the end of the floor adjacent to the shaft to receive hay deposited by said lifting means, a pull rope attached to the frame upon the opposite side from the first rope and extending forwardly with respect to the carrier, and a power driven wind-up drum about which the pull rope is wound to effect the forward pulling of the pull rope and the movement of the frame over said floor with a load thereon.

5. In a hay loader including a carrier having a floor and hay lifting mechanism for raising hay and depositing the same onto the floor, a power unit supported by the carrier adjacent one side of the floor and including a drum, a shaft disposed transversely of the carrier adjacent to the floor and remote from said power unit, a flexible frame disposed upon the floor adjacent to the shaft and having transverse spreader members whereby it is maintained in predetermined form, a rope connected with said frame and wound about said shaft, a rope connected with the frame upon the opposite side thereof from the first rope, and a pulley disposed upon the floor upon the end thereof remote from said shaft and disposed to have the last-mentioned rope passed thereabout to said power unit drum.

6. A hay rake and loader, comprising a wheeled structure including a frame, a floor unit horizontally supported by the frame and a vertical frame carried by the first frame and facilitating the stacking of hay on the floor unit, a raking unit attached to the first frame, means facilitating raising said raking unit from an operative position adjacent the ground to a dumping position above the floor unit, a horizontally disposed slatted frame overlying said floor unit and being supported for rectilinear movement longitudinally thereof, and means for shifting said horizontally disposed frame over said floor unit for the purpose of shifting a load of hay supported on the floor unit.

LOGAN E. BETZELBERGER.